United States Patent [19]

Nakamichi

[11] Patent Number: 4,583,134

[45] Date of Patent: Apr. 15, 1986

[54] CODED CONTROL SIGNAL TO CONTROL TAPE RECORDER

[75] Inventor: Niro Nakamichi, Higashikarume, Japan

[73] Assignee: Nakamichi Corporation, Tokyo, Japan

[21] Appl. No.: 326,008

[22] Filed: Nov. 30, 1981

Related U.S. Application Data

[63] Continuation of Ser. No. 104,265, Dec. 17, 1979, abandoned.

[30] Foreign Application Priority Data

Dec. 19, 1978 [JP] Japan .......................... 53-175495[U]

[51] Int. Cl.$^4$ ......................... G11B 5/02; G11B 15/52
[52] U.S. Cl. ..................................... 360/69; 360/27; 360/73; 360/79
[58] Field of Search ............................. 360/72.1–72.3, 360/74.1–74.7, 73, 69, 25, 27, 50, 60, 65, 14.3, 79; 369/42–49

[56] References Cited

U.S. PATENT DOCUMENTS

| | | | |
|---|---|---|---|
| Re. 28,006 | 5/1974 | Price, Jr. et al. | 360/73 |
| 2,689,884 | 9/1954 | Raff | 369/47 X |
| 2,780,679 | 2/1957 | Vandivere, Jr. | 369/47 |
| 2,782,398 | 2/1957 | West et al. | 360/72.2 X |
| 3,389,231 | 6/1968 | Brundage | 369/47 |
| 3,423,743 | 1/1969 | Silverman | 360/72.1 |
| 3,509,549 | 4/1970 | Ohta et al. | 360/79 |
| 3,536,858 | 10/1970 | Limbaugh et al. | 369/49 |
| 3,573,360 | 4/1971 | Rose, Jr. | 360/137 X |
| 3,643,013 | 2/1972 | Lemoine | 360/65 X |
| 3,668,648 | 6/1972 | Yoshikawa | 360/79 |
| 3,760,102 | 9/1973 | Robinson et al. | 360/27 X |
| 3,848,092 | 11/1974 | Shamma | 369/48 |
| 3,851,116 | 11/1974 | Cannon | 360/72.2 |
| 3,865,973 | 2/1975 | Masuda et al. | 360/10.1 X |
| 3,913,135 | 10/1975 | Damlamian | 360/79 |
| 3,990,108 | 11/1976 | Suga et al. | 360/73 |
| 4,038,692 | 7/1977 | Umeda et al. | 360/25 |
| 4,134,130 | 1/1979 | Tachi | 360/14.3 X |
| 4,193,100 | 3/1980 | Bagley et al. | 360/73 |
| 4,194,198 | 3/1980 | Baer et al. | 360/79 |

FOREIGN PATENT DOCUMENTS

| | | | |
|---|---|---|---|
| 0029714 | 3/1977 | Japan | 360/27 |
| 0050216 | 4/1977 | Japan | 360/27 |

Primary Examiner—Raymond F. Cardillo
Assistant Examiner—Steven R. Garland
Attorney, Agent, or Firm—Pearne, Gordon, Sessions, McCoy, Granger & Tilberry

[57] ABSTRACT

This invention relates to a control system for a tape recorder wherein a sound signal is recorded on a magnetic tape under one recording operating condition selected among a plurality of recording operating conditions and said sound signal recorded is reproduced from said magnetic tape under a playback operating condition corresponding to said selected recording operating condition, said control system comprising a generator to generate a control signal depending on said recording operating condition selected, a recorder to record said control signal on said magnetic tape prior to recording said sound signal, a reproducer to reproduce said control signal from said magnetic tape prior to reproducing said sound signal recorded, a selector to select one playback operating condition among a plurality of playback operating conditions, and a reproduced signal of said control signal controlling said selector so as to select a playback operating condition whereby said sound signal recorded is reproduced under said playback operating condition corresponding to said selected recording operating condition.

9 Claims, 2 Drawing Figures

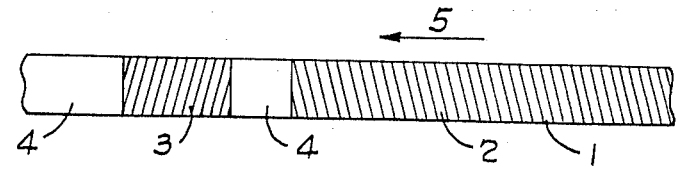
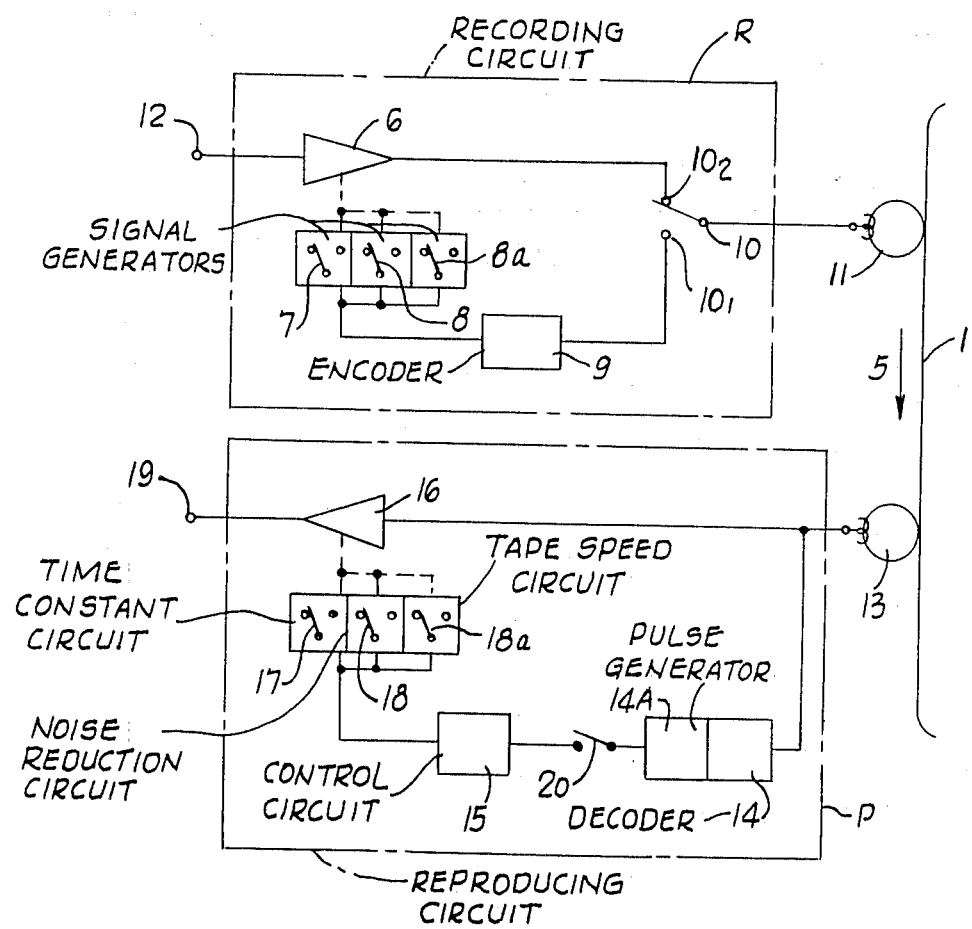
Fig. 1
Fig. 2 and FIG. 2 is a schematic diagram of a control system
CODED CONTROL SIGNAL TO CONTROL TAPE RECORDER This is a continuation of application Ser. No. 104,265, filed Dec. 17, 1979, now abandoned.

BACKGROUND OF THE INVENTION

Of late, there have been produced tape recorders with many different selectable conditions, so that the operation of the tape recorders has become more complicated. For example, a recording or reproducting condition may be selected according to the magnetic characteristics of a magnetic tape used so as to improve a playing characteristic, and a main sound signal is processed so as to be compressed at its recording and be expanded at its reproduction to get a good signal to noise ratio. In this case, an operator has the choice of selecting the time constant of recording and reproducing circuits depending on the magnetic characteristics of the magnetic tape used and the choice of selecting use or non-use of a noise reduction circuits. Therefore, the operator is required to select the reproducing condition or characteristic of the reproducing circuit at reproduction in accordance with the recording operating condition or characteristic selected. Thus, the recording operating condition or characteristic has been usually indicated on a carton in which the magnetic tape is contained. However, it has been frequently experienced that the indications on the carton tend to disappear during use. Otherwise, it has been frequently experienced that the operator has not indicated these conditions on the carton. Thus, the operator hesitates in the selection of the reproducing or playback operating condition.

SUMMARY OF THE INVENTION

Accordingly, it is a principal object of the invention to provide a control system for a tape recorder in which an optimum playback operating condition can be a visual indication of selected without a recording condition or bearing it in mind.

It is another object of the invention to provide a control system for a tape recorder in which a reproducing circuit can be more easily operated in an optimum manner.

In accordance with the invention, there is provided a control system for a tape recorder wherein a sound signal is recorded on a magnetic tape under one recording operating condition selected from the group of recording operating cnditions of noise reduction, circuit time constants, or tape speed, and said sound signal recorded is reproduced from said magnetic tape under a playback operating condition corresponding to said selected recording operating condition, said control system comprising means to generate a control signal depending on said recording operating condition selected, recording means to record said control signal on said magnetic tape prior to recording said sound signal, reproducing means to reproduce said control signal from said magnetic tape prior to reproducing said sound signal recorded, selecting means to select one playback operating condition among a plurality of playback operating conditions, and a reproducing signal of said control signal controlling said selecting means so as to select a playback operating condition whereby said sound signal recorded is reproduced under said playback operating condition corresponding to said selected recording operating condition.

BRIEF DESCRIPTION OF THE DRAWING

The above and other objects and features of the invention will be understood by those skilled in the art from the description of the embodiment of the invention which is taken with reference to the accompanying drawing in which;

FIG. 1 shows a model of a magnetic tape recorder in accordance with this invention;

and FIG. 2 is a schematic diagram of a control system of a tape recorder constructed in accordance with the invention.

DETAILED DESCRIPTION OF THE EMBODIMENT

In FIG. 1, there is shown a magnetic tape 1 recorded in accordance with a control system of the invention. A control signal 3 which is associated with or indicates selected recording operating condition is recorded on the magnetic tape 1 prior to recording a main sound signal 2 thereon. The magnetic tape 1 travels in the direction indicated by an arrow 5 in the figure when the control signal 3 or sound signal 2 is recorded thereon or reproduced therefrom. In FIG. 1, a numeral 4 designates a portion of the magnetic tape 1 where no signal is recorded.

The control signal may be formed of a serial binary coded signal having the number of bits determined by the number of elements of an operating condition and the content of each of the elements. For example, if there are two elements, the content of one of the elements is a selection of one of two time constants depending on the magnetic tape used and that of the other being a selection of use or nonuse of a noise reduction circuit, then the number of bits is at least two.

The control system of the invention is shown in FIG. 2 and may have two elements operating condition selectively provided, one of them being the above-mentioned selection of one time constant and the other being the above-mentioned selection of the noise reduction circuit.

When the magnetic tape 1 travels through the tape recorder, the control signal 3 is recorded on the magnetic tape by a recording head 11. A recording circuit R may comprise a change-over switch 10 having two contacts $10_1$ and $10_2$. When the main sound signal 2 is to be recorded on the magnetic tape 1, the contact $10_1$ of the change-over switch 10 is firstly closed to select an encoder 9 which is connected to a signal generator such as a time constant switch 7 and a noise reduction circuit switch 8 provided on a recording amplifier 6. The encoder 9 converts each signal generated in accordance with each selection of the switches 7 and 8 into a serial binary coded signal of pulses. As noted, if the switch 7 closes one of its contacts, then a signal is generated to select one of the time constants, while if it closes the other contact, then another signal is generated to select the other time constant. If the switch 8 is closed, then a signal is generated to select the use of the noise reduction circuit, while if it is open, then another signal is generated to select the non-use of the noise reduction circuit. Thus, it will be understood that the serial binary coded signal indicates the selected time constant and the use or nonuse of the noise reduction circuit. The serial binary coded signal is recorded on the magnetic tape 1 through the closed contact 1 of the change-over switch 10. Thereafter, the contact $10_2$ of the change-over switch 10 is closed so that the main sound signal 2 which is supplied at an input terminal 12 is recorded on the magnetic tape 1 through the recording amplifier 6 and then through the contact $10_2$ of the change-over switch 10. It will be understood that the control signal 3 may be recorded not only at a single portion prior to all sound signals 2, but also at a plurality of portons prior to the respective sound signals 2 on the magnetic tape 1. In the latter case, the control signals 3 and the sound signals 2 are recorded by repeatedly switching the change-over switch 10 in the same manner as described hereinjustbefore.

The control signal 3 and the sound signal 2 on the magnetic tape 1 are reproduced by a reproducing head 13 connected to a reproducing circuit P. The reproducing circit P comprises a decoder 14 connected to the reproducing head 13, a control circuit 15 connected through a cut-off switch 20 to the decoder 14. The control circuit 15 is associated with time constant switch 17 and a noise reduction circuit switch 18 provided on a reproducing amplifier 16, so than an output signal from the control circuit 15 operates the switches 17 and 18. Thus, the control signal 3 on the magnetic tape 1 is picked up by the reproducing head 13 and decoded by the decoder 14 to generate a pulse signal controlling the playback operating cndition of the reproducing circuit 16. The pulse signal is introduced into the control circuit 15, which operates the switches 17 and 18 to select playback operating condition of the reproducing amplifier 16 in accordance with the recording condition under which the following main sound signal was recorded. Thus, it will be noted that the reproducing condition of time constant depending on the magnetic tape 1 and of use or nonuse of the noise reduction circuit corresponds to the recording condition.

After that, the cut-off switch 20 is turned off so that the following signal is cut-off from the control circuit 15. The main sound signal 2 on the magnetic tape 1 is picked up by the reproducing head 13 and obtained through the reproducing amplifier 16 from an output terminal 19.

As noted from the foregoing description, the optimum condition of the reproducing amplifier 16 under which the main sound signal 2 is reproduced can be automatically set by the control signal 3 ahead of the main sound signal 2 on the magnetic tape 1. Thus, it will be noted that an operator is required neither to bear the recording condition in mind nor to obscure the indication thereof on a carton in which the magnetic tape 1 is contained. Also, it will be noted that reproduction of a playing sound such as music can be continuously made with an optimum characteristic.

Although, in the above embodiment, the recording and reproducing conditions may be only of selecting a time constant depending on the magnetic tape and using or nonusing the noise reduction circuit, they may include selecting a speed of the magnetic tape 1 in the tape recorder in which two or more speeds of the magnetic tape can be selected. Thus, it will be noted that the speed of the magnetic tape at which it travels during recording automatically can be selected when the magnetic tape travels for its reproduction.

While an embodiment of the invention has been described and illustrated with reference to the accompanying drawing, it will be understood by those skilled in the art that it is by way of example, and that various changes and modifications may be made without departing from the spirit and scope of the invention, which is intended to be defined only by the appended claims.

What is claimed is:

1. A control system for a tape recorder wherein a sound signal is to be recorded on a magnetic tape under a recording operating condition including at least one of noise reduction, circuit time constants, and tape speed, and the recorded sound signal is to be reproduced from the magnetic tape under a playback operating condition corresponding to a selected recording operating condition, said control system comprising:

a plurality of signal generators;

recording selecting means to select at least one signal generator to establish a selected recording operating condition;

means to generate a binary coded control signal depending on said selected signal generator and corresponding selected recording operating condition;

means to move the magnetic tape;

recording means to record said binary coded control signal longitudinally on the moving magnetic tape prior to longitudinally recording said sound signal on the same track;

reproducing means scanning said track to reproduce said binary coded control signal from the moving magnetic tape prior to reproducing said recorded sound signal; and playback selecting means responsive to the reproduced binary coded control signal to automatically select one of a plurality of playback operating conditions to reproduce said recorded sound signal in a playback operating condition corresponding to said selected signal generator and selected recording operating condition.

2. A control system for a tape recorder as set forth in claim 1, wherein said recording selecting means includes means to select one of said plurality of signal generators for a selected one of circuit time constants; and said generating means includes means to generate a binary coded control signal depending on said selected one of a plurality of signal generators and selected one of circuit time constants.

3. A control system for a tape recorder as set forth in claim 2, wherein said playback selecting means includes switch means to select a playback circuit time constant in accordance with the recorded binary coded control signal for the selected circuit time constant.

4. A control system for a tape recorder as set forth in claim 1, wherein said recording selecting means includes first switch means to select one of said plurality of signal generators to enable a noise reduction circuit; and said generating means includes means to generate a binary coded control signal depending on the selected position of said first switch means.

5. A control system for a tape recorder as set forth in claim 4, wherein said playback selecting means includes switch means to select a playback noise reduction circuit in accordance with the selected position of said switch means.

6. A control system for a tape recorder as set forth in claim 1, wherein said recording selecting means includes a first switch to select one of said plurality of signal generators for a selected one of recording tape speeds; and said generating means includes means to generate a binary coded control signal depending on a selected position of said first switch for said one of a plurality of signal generators and selected one of recording tape speeds.

7. A control system for a tape recorder as set forth in claim 6, wherein said playback selecting means includes switch means to select a playback tape speed in accordance with a selected position of said switch for the selected tape speed.

8. A control system for a tape recorder as set forth in claim 1, including an encoder to convert said signal from said selected signal generator into a binary code signal, and a changeover switch to selectively connect said encoder with a recording head.

9. A control system for a tape recorder as set forth in claim 1, wherein said reproducing means comprises a decoder connected to a reproducing head for decoding the reproduced signal of said binary coded control signal into a pulse signal, and a control circuit selectively connected to said decoder for receiving said pulse signal and controlling said playback selecting means so as to select said one playback operating condition.

* * * * *

UNITED STATES PATENT AND TRADEMARK OFFICE
CERTIFICATE OF CORRECTION

PATENT NO. : 4,583,134
DATED : April 15, 1986
INVENTOR(S) : Niro Nakamichi

It is certified that error appears in the above—identified patent and that said Letters Patent is hereby corrected as shown below:

Column 1, line 52, "cnditions" should be --conditions--

Column 3, line 8, "portons" should be --portions--

Column 3, line 27, "cndition" should be --condition--

Column 3, line 30 after "select" insert --the--

Signed and Sealed this

Thirtieth Day of December, 1986

Attest:

DONALD J. QUIGG

*Attesting Officer*          *Commissioner of Patents and Trademarks*